Patented Sept. 29, 1953

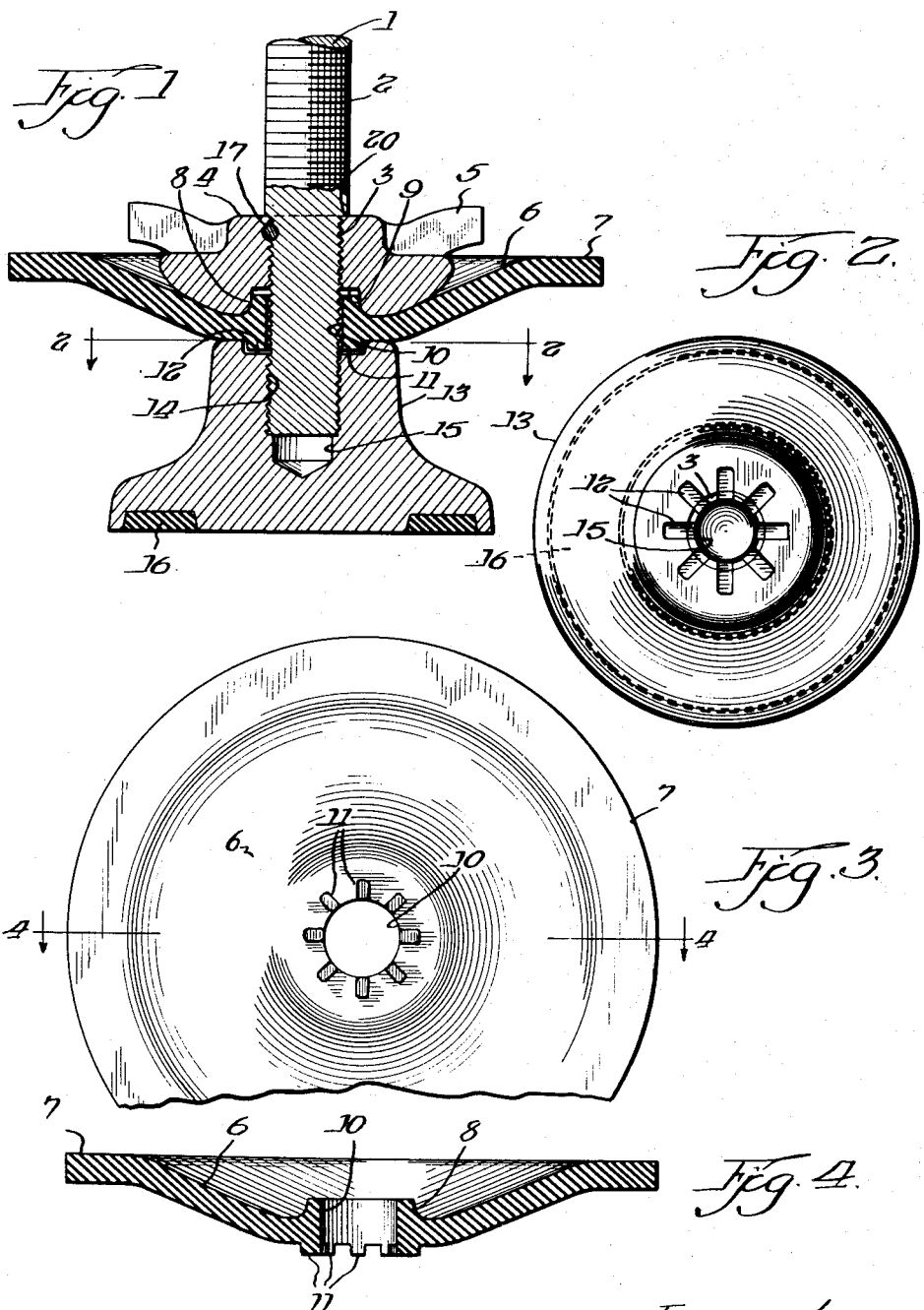

2,653,788

UNITED STATES PATENT OFFICE 2,653,788

CONNECTION FOR DIAPHRAGM VALVES

John E. Svabek, Jr., Chicago, Ill., assignor to Crane Co., Chicago, Ill.

Application June 15, 1949, Serial No. 99,227

1 Claim. (Cl. 251—31)

This invention relates broadly to a connection for diaphragm valves, and more specifically, it is concerned with a novel form of attachment between the clamping member or plunger and the closure member with the diaphragm held therebetween.

At the present time, in connection with providing a stem and disc holder connection suitable for holding the diaphragm therebetween, a relatively close fitting thread is provided to prevent the disc holder from loosening in service. This operation is an expensive one, and it ordinarily requires a great deal of care in assembling in order to prevent stem breakage and other valve damage. It has also long been desired to obtain an equal or more effective type of connection more economically.

Therefore, it is one of the more important objects of this invention to provide a construction in which raised serrations or lugs on the diaphragm and grooves or recesses, preferably cast or otherwise formed, in the top of the disc holder permit the use of a comparatively loose fit between the end threads of a stem, and still provide an assembly which is realtively simple and easy to accomplish.

Another important object is to provide for a structure in which the diaphragm during the normal course of valve service is prevented from loosening or tearing out at the point of connection, and which actually reinforces the diaphragm in a critical area.

Other objects and advantages will become more readily apparent upon proceeding with a reading of the specification considered in light of the accompanying drawings, in which:

Fig. 1 is a fragmentary sectional assembly view of a connection embodying my invention.

Fig. 2 is a sectional view taken on the line 2—2 of Fig. 1.

Fig. 3 is a plan view of the underside of the diaphragm.

Fig. 4 is a transverse section taken on the line 4—4 of Fig. 3.

Referring now to Fig. 1, a conventional stem construction is employed similar to that shown in my co-pending patent application, Serial No. 695,384, filed September 7, 1946, in which the stem 1 is provided with the usual threads 2, for effecting by rotation the reciprocal movement of the stem. It is provided at its lower end portion with a preferably reduced threaded shank 3, thereby enabling the latter portion to be threadedly received within the aperture 10 of the plunger 4, the latter member having the usual oppositely disposed arms 5, for purpose of preventing rotation of the latter member during the course of actual service. This is accomplished by engaging a bonnet (not shown) by means of a complementary lug recess to prevent such rotation. However, since this structure is not a part of this invention, it is, therefore, not necessary to describe it in detail or to be shown in any more detailed manner. The plunger 4 is suitably curved, as indicated, to receive a dished diaphragm 6. The latter member, as at 7, on its outer periphery is normally clamped in sealproof relation to the body and bonnet when finally assembled, but this is conventional and accordingly will not be described in any greater detail. The upper surface portion of the diaphragm 6 is provided with an annular collar 8, receivable preferably snugly within a suitable recess 9 on the underside of the plunger 4. On its opposite side, the diaphragm 6 is provided with the radially extending lugs 11, as more clearly shown in Fig. 3, which lugs are receivable within the recesses 12 of similar form, as shown more clearly in Fig. 2, applied to the hub of the closure member 13. The latter member is threaded, as at 14, to receive the threaded shank 3 of the stem 1. If desired, the closure member 13 may be provided with an end relieved portion 15, and it also may be used, if desired, with the composition seating insert 16.

It should of course be clear that the lugs 11 and the recesses 12 may be provided either increased or reduced from the number shown in the drawings depending upon the requirements and size of the installation. For example, the lugs and grooves may be arranged as an interlocking pair diametrically or tangentially disposed, or if deemed desirable, a plurality of radially disposed lugs or recesses may be used, as illustrated. It will also be understood that the lugs and recesses are interchangeable in their positioning, so that the recesses, if desired, may be applied to the diaphragm 7 and similarly the lugs may be applied to the closure member 13.

The entire assembly when completed is then held in fixed relation, by means of the pin 17, so that the lugs 11 securely and snugly engage the recesses radially extending upon the upper surface of the closure member 13. The upper hub portion 8 of the diaphragm 6 is received within the recess 9 on the underside of the plunger 4.

By adopting this construction, that is, using the raised serrations or lugs on the diaphragm in the recesses or grooves in the closure member, it may be cast or otherwise suitably formed on the disc holder, as shown. The threads 3 may be made relatively loose fitting, because the real security and firmness of the contact and the connection between the respective assembled members is assured by the intimate engagement provided between the respective lugs and recesses 11 and 12.

The construction, of course, is relatively economical because it does not require any special or unusually precise machining. The diaphragm may obviously be molded with the lugs in position and the efficiency of the resulting joint will not be impaired. Preferably, although not necessarily, the stem may be shouldered in the plunger, as at 20.

While only a single embodiment has been shown and described, it will, of course, be apparent that a variety of forms of engaging lugs and recesses may be employed between the diaphragm and closure member without departing from the spirit of the invention as defined by the appended claim.

I claim:

In a diaphragm valve, a diaphragm having a central aperture and a surrounding collar integral therewith around the aperture, the lower portion of the collar having spaced-apart raised surfaces, a closure member therefor, the upper surface of said closure member having corresponding spaced-apart recessed surfaces to receive said diaphragm spaced-apart surfaces with a predetermined endwise clearance therebetween thereby to provide interfitting faces, a projecting annular portion on said closure member upper surface surrounding said recessed closure member spaced-apart surfaces, a plunger member superposed on said diaphragm and having a central aperture and a lower annular relieved portion to receive the upper portion of said diaphragm collar with a predetermined endwise clearance therebetween, an annular depending portion on said plunger surrounding said plunger relieved portion, stem means extending through said plunger and diaphragm and being rigidly held relative to the closure member to draw the latter members together whereby said plunger depending portion and said closure member projecting portion are contacted to effect a fluid tight seal with said diaphragm.

JOHN E. SVABEK, Jr.

References Cited in the file of this patent

UNITED STATES PATENTS

| Number | Name | Date |
|---|---|---|
| 171,344 | Boettcher | Dec. 21, 1875 |
| 1,639,446 | Zannoth | Aug. 16, 1927 |
| 1,983,106 | Sundstrom | Dec. 4, 1934 |
| 2,243,255 | McDonald | May 27, 1941 |
| 2,264,656 | Briscoe | Dec. 2, 1941 |
| 2,395,095 | Brady | Feb. 19, 1946 |